United States Patent Office 2,980,675
Patented Apr. 18, 1961

2,980,675
PROCESS FOR THE PRODUCTION OF THIOPHOSPHORIC ESTERS OF SYMMETRICAL TRIAZINES

Werner Schwarze, Frankfurt am Main-Griescheim, Germany, assignor to Deutsche Gold- und Silber-Scheideanstalt vormals Roessler, Frankfurt am Main, Germany No Drawing. Filed May 28, 1954, Ser. No. 433,261

Claims priority, application Germany June 2, 1953

6 Claims. (Cl. 260—248)

The present invention relates to a process for the production of thiophosphoric acid esters of symmetrical triazines which hitherto had not been known to the art. It has now, unexpectedly, been found that such esters can easily be obtained by converting the alkali salts of dialkylthiophosphoric acid esters as, for instance, salts of dialkylthiophosphates with substituted derivatives of halogen triazines or with cyanuric halides. Good results were obtained by carrying out the reaction in a suitable inert solvent, as, for instance, paraffine or benzol hydrocarbons.

The reactants, i.e. the triazine derivatives according to the invention, are, for instance dialkoxy halogen triazine:

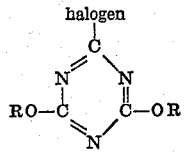

alkoxy halogen triazine:

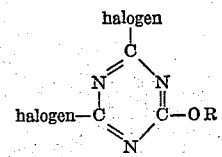

dialkyl amino halogen triazine:

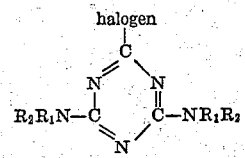

monoalkyl di-halogen triazine:

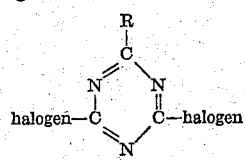

dialkyl mono-halogen triazine:

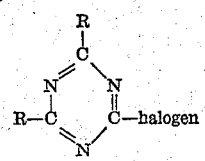

The conversion may be carried out at room temperature, preferably, however, at elevated temperatures, for instance, at the boiling point of benzol.

Even in vacuo, the condensation products thus obtained have such a high boiling point that they cannot be distilled without being decomposed.

The reaction products according to the invention are highly efficient insecticides and therefore especially suited for the extermination of vermin.

Example 1

230 grs. of diethylthiophosphate potassium are suspended in 1 litre of toluol. To this suspension a solution of 121 grs. of dichlorophenoxy triazine in 300 cc. of toluol is added whilst stirring. The mixture is heated to a temperature of about 90 to 100° C. for 3 hours and then cooled. A quantity of 500 cc. of water is added to the mixture and afterwards withdrawn. The toluol solution is then washed with a solution of sodium bicarbonate and once more with water, dried with sodium sulfate and concentrated by evaporation. 240 grs. of a yellow oil of the following formula:

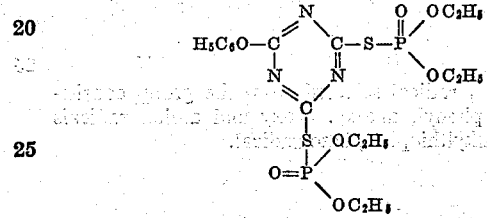

were recovered from the residue.

Example 2

37.8 grs. of diethyl thiophosphate sodium are suspended in 200 cc. of benzol. A solution of 41.5 grs. of dicholoropentachlorophenoxy triazine (Fp.:205° C.) in 150 cc. of benzol are slowly added whilst stirring. The mixture is worked at the reflux condenser for 2 hours and then worked up according to Example 1.

58.1 grs. of di-(diethylthiophosphato-)-pentachlorophenoxy-s-triazine were obtained as a brown oil.

Example 3

A mixture of 17.6 grs. of dimethoxychloro-s-triazine and 19 grs. of diethylthiophosphate sodium in 150 cc. of benzol were boiled at the reflux condenser for 4 hours, cooled, repeatedly washed with water, diluted hydrochlorine acid and a solution of sodium bicarbonate, dried and the solvent distilled off.

25.4 grs. of dimethoxydiethyl thiophosphato-s-triazine were obtained as a light yellow oil.

Example 4

A suspension of 19 grs. diethylthiophosphate sodium in 100 cc. of toluol and 19.3 grs. of dimethylamino-dichloros-triazine in 100 cc. of toluol were heated to a temperature of 70 to 80° C. for 3 hours at the reflux condenser and then worked up according to Example 3.

29.1 grs. of dimethylamino-di-(diethylthiophosphato-)-s-triazine were obtained.

Example 5

A mixture of 45 grs. of phenyldichloro-s-triazine and 83 grs. of potassium diethylthiophosphate in 750 cc. of a paraffine hydrocarbon fraction (Fp.:120 to 150° C.) was heated to a temperature of 110 to 120° C. for 4 hours whilst stirring. After cooling down, the mixture was shaken with water to remove the potassium chloride formed in the reaction. After the mixture of hydrocarbons had been evaporated in vacuo, a residue of 41 grs. of a yellow oil was obtained, which cannot be distilled and substantially consists of di-(diethylthiophosphato-)-phenyl-s-triazine.

Example 6

19.2 grs. of diethylthiophosphate sodium are suspended in 100 cc. of xylol, and 6.1 grs. of cyanuric chloride are added whilst stirring at a temperature of about 100° C. A yellow substance is precipitated, the forming of which is terminated after 4 hours, approximately.

14.1 grs. of this precipitate, which is insoluble in water and in xylol and which consists of tri-(diethylthiophosphato-)-s-triazine, were obtained.

I claim:

1. A process for the production of thiophosphoric acid esters of symmetrical triazines consisting in reacting cyanuric chloride with alkali salts of thiophosphoric acid esters in the presence of inert solvents at temperatures between 20 and 150° C.

2. A dialkylthiophosphoric acid ester of a symmetrical triazine having a formula selected from the group consisting of

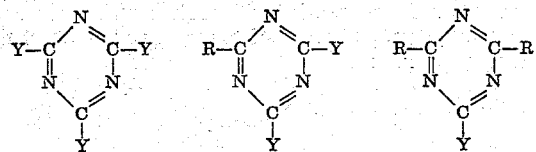

wherein R is a radical selected from the group consisting of alkyl, phenyl, alkoxy, aroxy and amino radicals and Y is a dialkylthiophosphato radical.

3. A process for the production of a dialkylthiophosphoric acid ester of a symmetrical triazine which comprises reacting an alkali metal salt of dialkyldithiophosphoric acid with a halogenated symmetrical triazine of a formula selected from the group consisting of

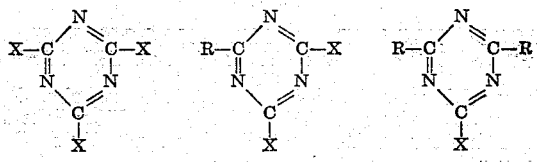

wherein X is halogen and R is a radical selected from the group consisting of alkyl, phenyl, alkoxy, aroxy and amino radicals.

4. The process of claim 3 in which such reaction is carried out in the presence of an inert solvent.

5. The process of claim 3 in which such reaction is carried out at temperatures between 20 and 150° C.

6. The process of claim 3 in which such reaction is carried out in the presence of an inert solvent at temperatures between 20 and 150° C.

References Cited in the file of this patent

FOREIGN PATENTS 936,690    Germany _____ Dec. 22, 1955